US005704600A

United States Patent [19]

Robinson

[11] Patent Number: 5,704,600

[45] Date of Patent: Jan. 6, 1998

[54] POWER OPERATED CLAMP ASSEMBLY

[76] Inventor: Brian Owen Robinson, 16625 Kingston, Fraser, Mich. 48026

[21] Appl. No.: 567,284

[22] Filed: Dec. 5, 1995

[51] Int. Cl.[6] ........ B23Q 3/06

[52] U.S. Cl. ........ 269/32; 269/25; 269/228; 269/27

[58] Field of Search ........ 269/32, 25, 66, 269/20, 27, 201, 228

[56] References Cited

U.S. PATENT DOCUMENTS

| | | | |
|---|---|---|---|
| 2,350,034 | 5/1944 | Herringtion | 269/228 |
| 2,436,941 | 3/1948 | Sendoykas | 269/228 |
| 3,116,058 | 12/1963 | Blatt . | |
| 3,347,542 | 10/1967 | Mericle, Jr. | 269/228 |
| 3,545,050 | 12/1970 | Blatt et al. | 269/228 |
| 4,331,326 | 5/1982 | Strouss | 269/228 |
| 4,469,138 | 9/1984 | Satoh . | |
| 4,496,138 | 1/1985 | Blatt . | |
| 4,576,367 | 3/1986 | Horn et al. | 269/32 |
| 4,637,597 | 1/1987 | McPherson et al. . | |
| 4,723,767 | 2/1988 | McPherson et al. | 269/228 |
| 5,118,088 | 6/1992 | Sawdon . | |
| 5,165,670 | 11/1992 | Sawdon . | |
| 5,171,001 | 12/1992 | Sawdon . | |

*Primary Examiner*—Timothy V. Eley
*Assistant Examiner*—Lee Wilson
*Attorney, Agent, or Firm*—Brooks & Kushman PC

[57] ABSTRACT

A power operated clamp assembly 10 includes a clamp body 12, a reciprocatable member 20 extending into the clamp body 12, and a clamp arm 22 pivotally mounted to the clamp body 12 by a first pivot element 36. The clamp arm 22 is pivotable about a pivot axis 38 of the first pivot element 36 between first and second positions of movement termination C and D, respectively. A linkage assembly 46 has a drive end 48 adjustably secured to an end 56 of the reciprocatable member 20, and a clamp end 50 operatively secured to the clamp arm 22 so as to pivot the clamp arm 22 as the member 20 reciprocates. The linkage assembly 46 includes a connection pivotable about the pivot axis of a second pivot element 80. The drive end 48 is adjustable with respect to the end 56 of the reciprocatable member 20 so as to allow adjustment of the first and second positions C and D, respectively. One pivot element of the first and second pivot elements 66 and 80, respectively, includes an eccentric shaft having a central axis 124. The eccentric portion 120 defines the pivot axis 122 of the one pivot element, and the pivot axis 122 of the one pivot element is displaced from the central axis 122.

18 Claims, 5 Drawing Sheets

POWER OPERATED CLAMP ASSEMBLY

TECHNICAL FIELD

The present invention relates to a power operated clamp assembly.

BACKGROUND ART

The use of industrial clamping products has become widespread, due at least in part to high demands in the automotive and heavy equipment industries. Conventionally, the clamps are powered by a linear actuator such as an air or hydraulic cylinder having a predetermined stroke length and fixed positive repeatable end of stroke stop points defined by the length of the cylinder. A power operated clamp assembly typically includes a reciprocatable rod member driven by the cylinder, and a clamp body secured to the cylinder. A clamp arm is pivotally mounted to the clamp body, and a linkage assembly operatively connects the rod member to the clamp arm. The linkage assembly usually includes a plurality of pivotal connections. The clamp arm pivots between open and closed positions of motion termination in response to actuation of the rod member. Examples of existing power operated clamps are disclosed in U.S. Pat. Nos. 4,496,138, issued to Blatt; 4,637,597, issued to McPherson et al.; and 5,118,088, issued to Sawdon.

Power operated clamp assemblies, or power clamps, are generally available with either a 90° or 180° closure position of the clamp arm. The 90° closure position is at a right angle to the center line of the cylinder. The clamp is closed when the rod member is in the extended position. This is referred to as a 90° clamp. When this clamp is open, the clamp arm is about 180° to the cylinder center line. The open position varies with differences in the total range of clamp arm travel. A 180° clamp is closed and the rod member is extended when the clamp arm is at 180°.

The motion termination positions of the clamp arm may be affected by tolerance build up during manufacturing, causing undesired variations of the closed or clamping position. As a result, the motion termination positions will vary from clamp to clamp. After a period of use, tool wear may also cause undesired variations of the clamp arm positions. Clamp arm wobble or side slop may develop. Improper installation or mounting of the clamp assembly could further vary the clamp arm positions.

A primary disadvantage associated with existing power operated clamp assemblies is the fact that the clamps have inadequate ways to make adjustments to compensate for undesired variations of the motion termination positions such as those caused by tolerance build-up, error in mounting the clamp assembly, or tool wear. Conventional adjustments may include stop blocks used to preemptively shorten the stroke of the linear actuator and clamp by means of interference. Existing clamp assemblies may begin to show wear in a couple of thousand strokes, and lose clamping ability due to back lash slop or due to side slop of the clamp arm.

SUMMARY OF THE INVENTION

It is, therefore, an object of the present invention to provide an improved power operated clamp assembly.

It is another object of the present invention to provide a power operated clamp assembly having adjustable positions of clamp arm motion termination.

It is a further object of the present invention to provide a power operated clamp assembly having a self-centering clamp arm to compensate for clamp arm side slop.

In carrying out the above objects and other objects and features of the present invention, a power operated clamp assembly is provided. The power operated clamp assembly comprises a clamp body, and a reciprocatable member extending into the clamp body and adapted to engage a driving means such as a linear actuator. The member is reciprocatable between extended and retracted positions. A clamp arm is pivotally mounted to the clamp body by a first pivot element. The clamp arm is pivotally moveable about a pivot axis of the first pivot element. The clamp arm terminates its movement at first and second positions. The first and second positions are adjustable with respect to the clamp body. A linkage assembly operatively connects the member to the clamp arm so as to pivot the clamp arm between the first and second positions as the member reciprocates between the extended and retracted positions. The linkage assembly includes a connection pivotable about a pivot axis of a second pivot element.

One pivot element of the first and second elements includes an eccentric shaft having a central axis. The eccentric shaft includes an axially extending eccentric portion. The eccentric portion defines the pivot axis of the one pivot element. The pivot axis of the one pivot element is displaced from the central axis of the one pivot element. The eccentric shaft is rotationally adjustably secured to the clamp body so as to allow angular adjustment of the pivot axis of the one pivot element with respect to the central axis of the one pivot element. Rotationally adjusting the eccentric shaft adjusts the first and second positions of clamp arm motion termination with respect to the clamp body.

In one embodiment, the linkage assembly has a drive end and a clamp end. The drive end is adjustably secured to an end of the reciprocatable member. The clamp end is operatively secured to the clamp arm. The drive end is adjustable with respect to the end of the member so as to allow adjustment of the first and second positions of the clamp arm with respect to the clamp body.

In a preferred construction, the power operated clamp assembly includes a connection pivotable about a pivot shaft having at least one spacer received on the pivot shaft. The spacer is formed of sufficiently soft material so as to undergo preferential distortion under compressive forces applied to the connection. By distortion of the spacer, clamp bind is reduced at the connection.

Further, in a preferred construction, the power operated clamp assembly includes at least one spring washer received on the pivot element which mounts the clamp arm. Preferably, a spring washer is positioned on each side of the clamp arm. The spring washers are positioned so as to continuously urge the clamp arm toward a perpendicular orientation with respect to the pivot axis of the pivot element which mounts the clamp arm. This compensates for side slop of the clamp arm.

The advantages accruing to the present invention are numerous. For example, the power operated clamp assembly of the present invention is internally adjustable to compensate for undesired variations of the clamp arm motion termination positions without interfering with the stroke length of the actuator of the clamp arm with a stop block functioning as an anvil.

The above objects, and other objects, features and advantages of the present invention will be readily appreciated by one of ordinary skill in the art from the following detailed description of the best mode for carrying out the invention when taken in connection with the accompanying drawings.

BEST MODES FOR CARRYING OUT THE INVENTION

Figure 1:
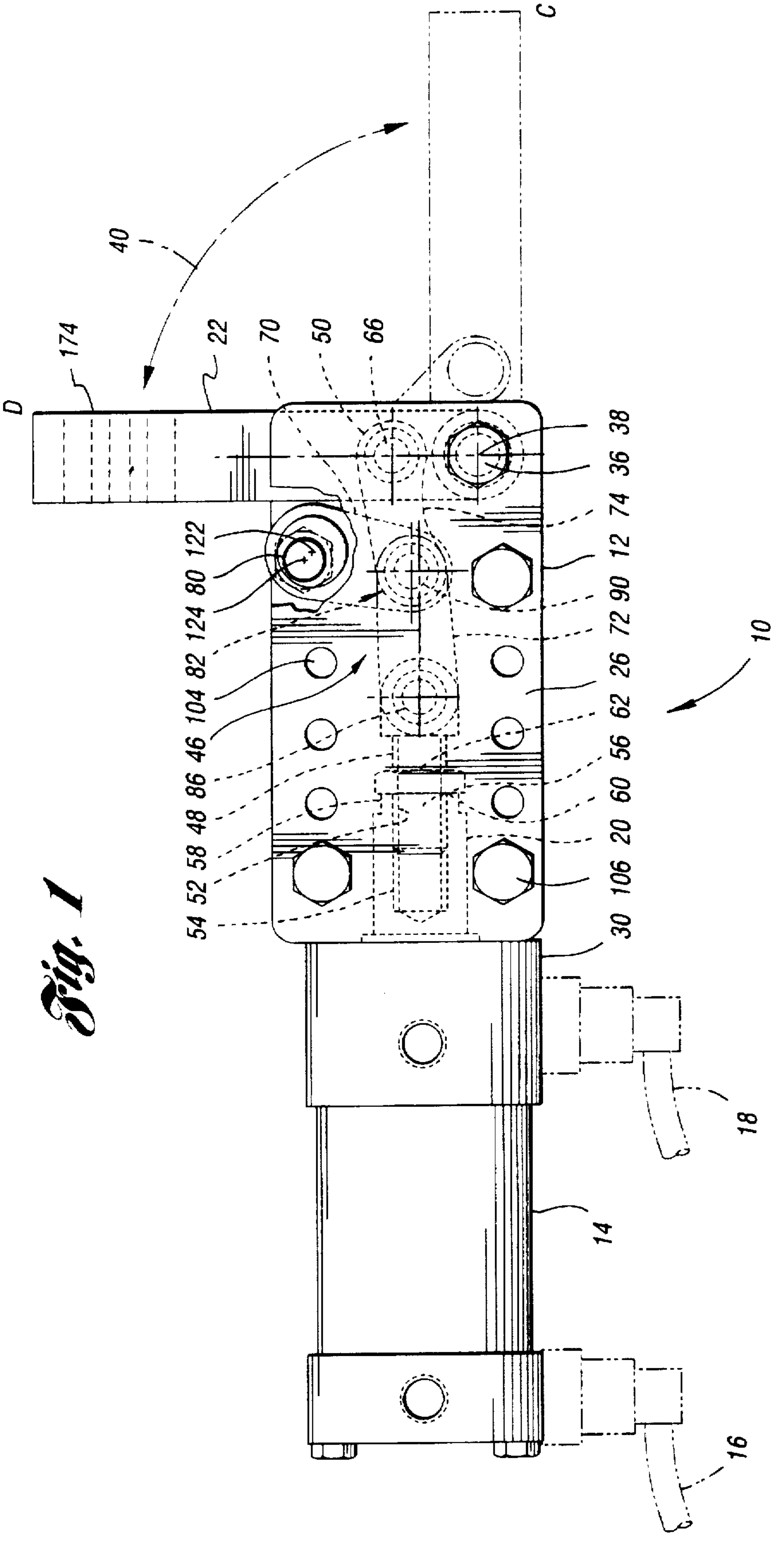
FIG. 1 is a side elevation, partially broken away, of a power operated clamp assembly made in accordance with the present invention.

Referring to FIG. 1, a power operated clamp assembly made in accordance with the present invention is generally indicated at 10. A clamp body 12 is secured to a driving means such as an air or hydraulic cylinder 14. Fluid lines 16 and 18 are in communication with cylinder 14. A reciprocatable member such as cylinder rod 20 extends from cylinder 14 into clamp body 12. A clamp arm 22 is pivotally mounted to clamp body 12.

Figure 2:
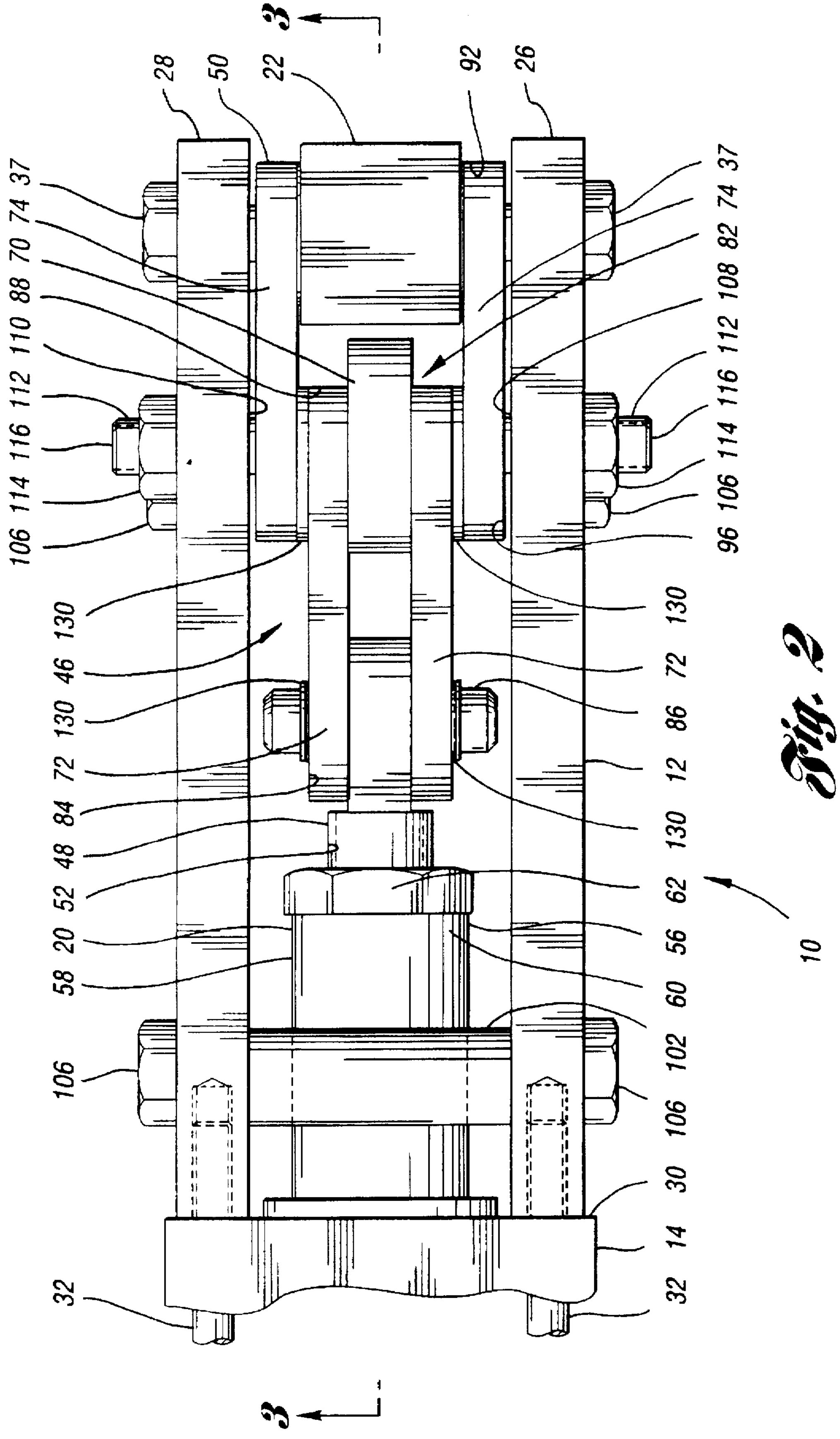
FIG. 2 is a top view of the power operated clamp assembly of FIG. 1.
Figure 3:
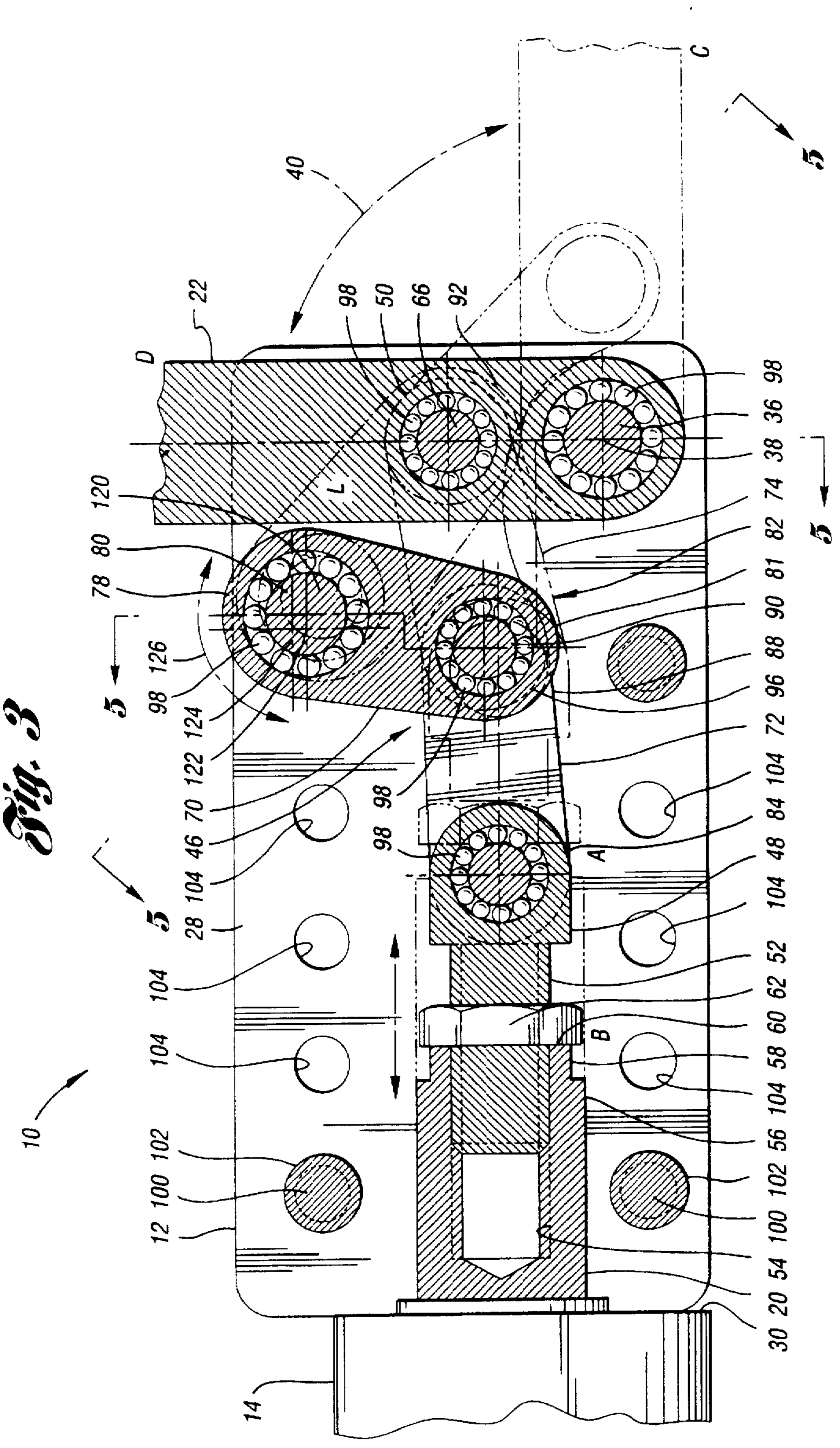
FIG. 3 is an enlarged side view, in section, taken along line 3—3 of FIG. 2, showing the adjustable drive end and eccentric shaft.
Figure 4:
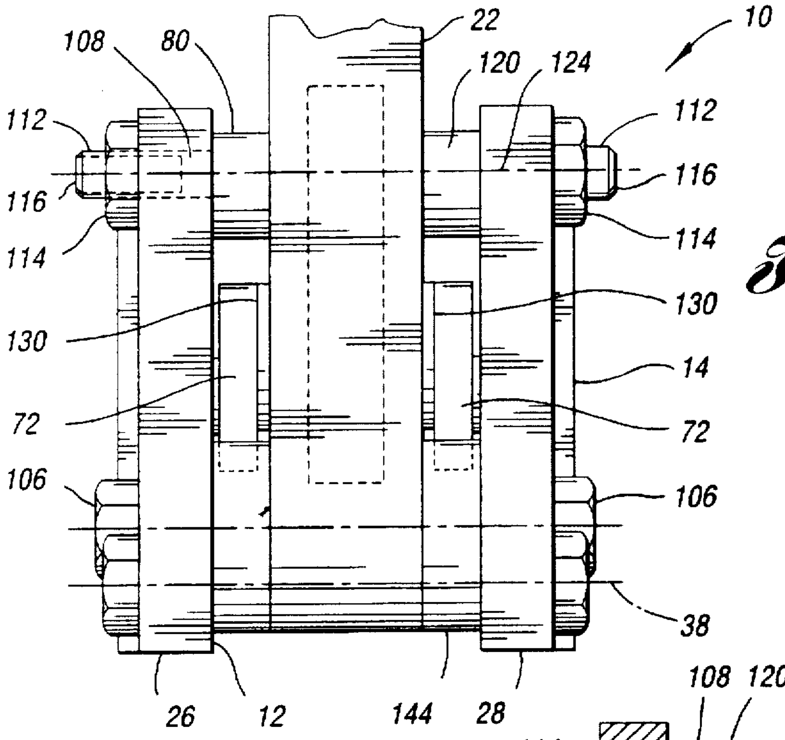
FIG. 4 is an end view of the power operated clamp assembly of FIG. 1.

Turning now to FIGS. 1–3, clamp body 12 includes first and second side plates 26 and 28, respectively, secured together. Cylinder 14 includes a cylinder head 30 secured to side plates 26 and 28, by a plurality of cylinder tie rods 32.

The cylinder rod 20 is reciprocatable between an extended position indicated in phantom at A (FIG. 3), and a retracted position indicated at B (FIG. 3). A first pivot element 36 mounts clamp arm 22, the clamp arm being pivotable about the pivot axis 38 of first pivot element 36 over a motion range indicated by arrow 40. Clamp arm 22 pivots between a first position indicated at C (FIGS. 1 and 3), and a second position indicated at D (FIGS. 1 and 3). First pivot element 36 is threadedly secured by a bolt 37 (FIG. 2) on each side of first pivot element 36. A linkage assembly, generally indicated at 46, has a drive end 48 and a clamp end 50. Drive end 48 has external threads 52 for mating with internal threads 54 located at an end 56 of cylinder rod 20.

End 56 of cylinder rod 20 includes wrench flats 58 and a seat 60. A jam nut 62 engages seat 60 to secure the drive end 48 with respect to end 56 of cylinder rod 20 in a selected position.

Referring primarily to FIG. 3, clamp end 50 is secured to clamp arm 22 by a second pivot element 66. As used herein, second pivot element may refer to any of the pivot elements numbered 66, 80, 86, or 90. Linkage assembly 46 includes an idler link 70, a drive link 72, and a clamp link 74. Idler link 70 has a first end 78 pivotally mounted to clamp body 12 by a pivot element such as eccentric shaft 80. The other end 81 of idler link 70 defines a central link connection 82. One end 84 of drive link 72 is connected to cylinder rod 20 by pivot element 86. The other end 88 of drive link 72 connects to central link connection 82 by way of pivot element 90. Clamp link 74 has one end 92 connected to clamp arm 22 by pivot element 66. The other end 96 of the clamp link 74 connects to central link connection 82 by way of pivot element 90.

It should be appreciated that each of the pivot elements 36, 66, 80, 86, and 90 includes needle bearings 98 to facilitate movement. The bearings 98 run on hardened shafts and are replaceable by maintenance shelf stock. The clamp assembly 10 includes needle bearings 98 at most wear points, and all motion stems from these bearings 98. Further, the configuration of linkage assembly 46 decreases overall clamp width. The width of the idler link 70 to drive link 72 connection is less than the clamp arm width. This allows the clamp link 74 to be the outermost link in linkage assembly 46, and clamp arm 22 to be received between the pair of clamp link elements 74.

Side plates 26 and 28 each have a plurality of apertures 100, 104. A plurality of shafts 102 extend through some of the apertures 100 and secure side plates 26 and 28 together. The remaining apertures 104 can be used to mount clamp assembly 10 for use. Bolts 106 are threadedly received in the ends of shafts 102 for securement thereof. As best shown in FIG. 2, eccentric shaft 80 extends through apertures 108 and 110 in clamp side plates 26 and 28, respectively. Eccentric shaft 80 has threaded end portions 112 for receiving nuts 114. The end portions 112 have hex sockets 116 for receiving a hexagonal wrench which is not specifically shown.

Figure 5:
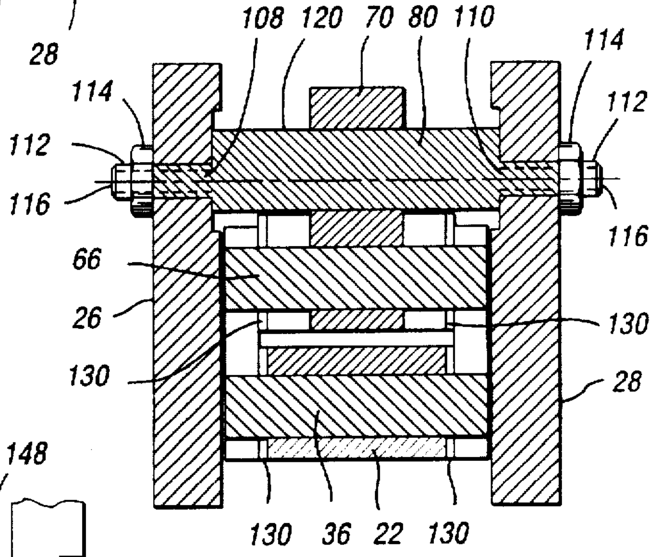
FIG. 5 is an end view, in section, taken along line 5—5 of FIG. 3 when the clamp arm is in the position indicated at C and shown in phantom, illustrating the eccentric shaft.

Referring primarily to FIG. 5, eccentric shaft 80 includes an axially extending eccentric portion 120. The eccentric portion 120 defines a pivot axis 122 (FIGS. 1 and 2) that is displaced from a shaft central axis 124. By loosening hex nuts 114, eccentric portion 120 can be rotated to angularly adjust the position of pivot axis 122 with respect to central axis 124. This is indicated at arrow 126 (FIG. 3). Angular adjustment of eccentric portion 120 will adjust the first and second positions of motion termination indicated at C and D, angularly displacing the first position C and the second position D with respect to pivot axis 38 and clamp body 12. To position the eccentric shaft 80 and hold it while tightening the nuts 114, a hexagonal wrench is inserted into one of the hex sockets 116. The eccentric shaft movement is transferred to clamp arm 22 via linkage assembly 46, and constitutes an adjustment of the first and second clamp arm positions C and D, respectively.

It is to be appreciated that alternatively, pivot element 80 could be a straight shaft, and first pivot element 36 could include an eccentric portion. Angular adjustment of first pivot element 36 would then adjust the clamp arm positions C and D directly. In a preferred construction, pivot axis 122 is displaced from central axis 124 by about ⅛ inch or about 3.2 mm. Further, drive end 48 is sufficiently adjustable so as to allow a total adjustment range of at least about ¼ inch or about 6.4 mm by threading drive end 48 into end 56 of cylinder rod 20 and locking the selected position with jam nut 62. The drive end adjustment is preferably intended for use primarily at clamp installation. This adjustment lengthens or shortens the distance from the end 56 of cylinder rod 20 to pivot element 86. By using both the eccentric shaft type adjustment and the drive end adjustment, the clamp arm positions C and D can be adjusted as desired for any particular clamping operation.

With continuing reference to FIGS. 2–5, pivot elements 66 and 86 each receive a pair of spacer washers 130. Side plates 26 and 28, and links 70, 72, and 74 are made of steel. Spacer washers 130 are made from a sufficiently soft material, that is, softer than the side plates and links. For example, spacer washers 130 could be made brass or bronze. The spacer washers 130 will distort under compressive forces acting on the pivot element such as those introduced when the clamp is attached to a mounting block received between side plates 26 and 28. For example, when the mounting block is bolted between the clamp side plates 26 and 28, the linkage components may be placed under compression. When the washers 130 distort, the total thickness of the connections is then reduced by localized preferential absorption of compressive strain by the washers 130. This decreases the tendency for excessive wear on the clamped components caused by components binding each other and the side plates 26 and 28.

Although the materials are similar, the disclosed invention differs from a conventional thrust bearing washer. Under proper clamp installation conditions, there will be no appreciable load or compression imposed on the spacer washers 130. However, improper installation of clamps, causing compression of the internal components, is common. The disclosed soft washer is designed for localized preferential distortion under load.

Figure 6:
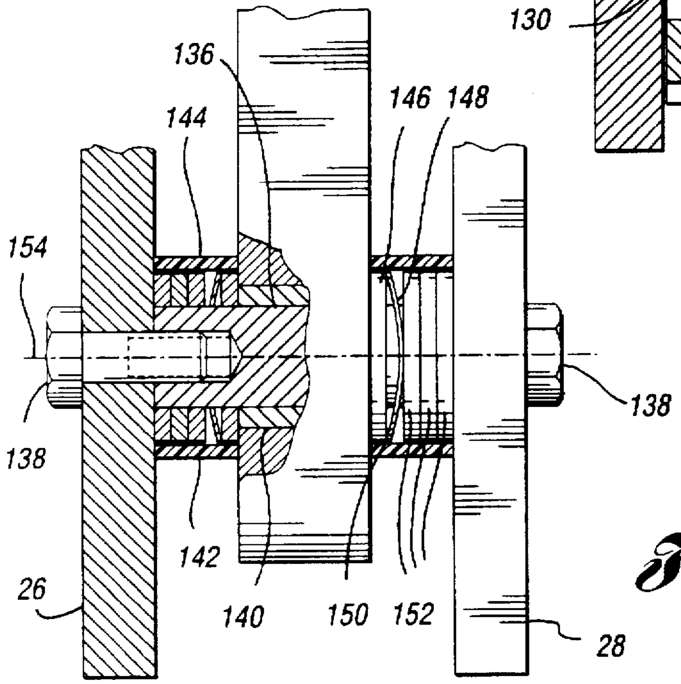
FIG. 6 is an end view, partially in section, showing a self-centering clamp arm.

Referring to FIG. 6, a self-centering clamp arm made in accordance with the present invention is illustrated. Clamp arm 22 is pivotally mounted between side plates 26 and 28 by pivot shaft 136 which is secured to clamp side plates 26 and 28 by bolts 138. Clamp arm 22 pivots on needle bearings 140. Each end of pivot shaft 136 is similarly constructed and receives a thrust bearing assembly 142 enclosed by a dust boot 144. A hard washer 146 is positioned against the clamp arm 22. A spring washer 148 is received on pivot shaft 136, and the outer edge 150 of the spring washer 148 engages hard washer 146. A plurality of hard washers 152 are received between spring washer 148 and clamp side plates 26 and 28. By tightening bolts 138, spring washer 148 is deformed and continuously urges clamp arm 22 toward a perpendicular orientation with respect to pivot axis 154 of pivot shaft 136. This compensates for side slop resulting from the wearing of clamp components.

It should be appreciated that even in the case of severe side load, the arm would yield about 0.010 inch (given about 30 lbs. of side load) and will then return to center as soon as the load is lifted. If the side load remains constant, the arm will track reliably true at the 0.010 inch slop without causing excessive wear.

Figure 7:
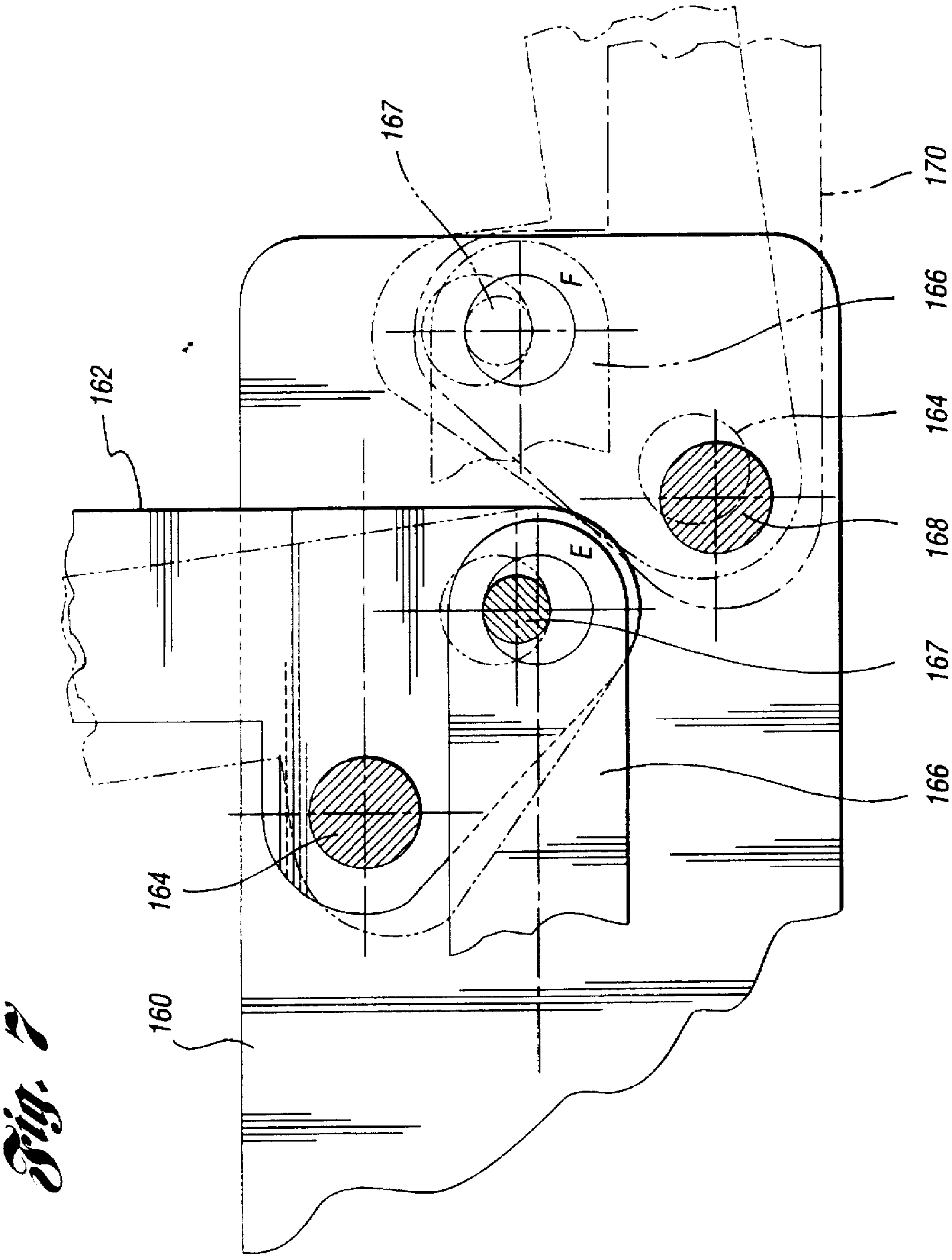
FIG. 7 is an enlarged side view, in section, showing a reversible clamp arm assembly made in accordance with the present invention.

Referring now to FIG. 7, a reversible clamp arm made in accordance with the present invention is shown. A pair of clamp side plates 160 has a clamp arm 162 mounted therebetween by a pivot shaft 164. A linkage 166 is operatively connected by pivot element 167 to clamp arm 162 so as to pivot the clamp arm 162 in a manner previously described. Clamp arm 162 is a 90° clamp arm, that is, when linkage 166 is in the extended position indicated at E, clamp arm 162 is oriented perpendicular to the clamp side plates 160. Further, pivot shaft 164 includes an eccentric portion 168 for adjusting the clamp arm positions of motion termination.

Clamp arm 170, shown in phantom, is a 180° clamp arm, that is, when linkage 166 is in the extended position indicated at F, clamp arm 170 is oriented parallel to the clamp side plates 160.

It should be appreciated that a clamp assembly made in accordance with the present invention, as illustrated in FIG. 7, uses the same clamp arm mounted at a different fixed pivot point in the clamp to achieve a 90° clamp arm or a 180° clamp arm.

Referring to FIGS. 1–3, the operation of clamp assembly 10 will now be described. Clamp arm 22 pivots from the first position indicated at C, to the second position indicated at D, in response to movement of cylinder rod 20. As cylinder rod 20 approaches the extended position A, central link connection 82 will "toggle" lock, locking the clamp in the closed 180° position. The locked position of the linkage assembly 46 is best shown in phantom, in FIG. 3, indicated at L. This is referred to as a "toggle" clamp.

Referring to FIG. 7, in some applications, a locking mechanism is not desired. This clamp arrangement is referred to as a "basic" or non-locking clamp. The clamp pivots in response to cylinder rod 20 as previously described.

In a preferred construction of either clamp arrangement, all mounting dimensions are held close to tolerance including clamp width so as to eliminate the need for custom mounting each clamp. Clamp arm 22 is machined and has a plurality of mounting holes 174 so that tooling can be mounting without welding. Further, the clamps are sized to accept standard National Fluid Power Association cylinders so that cylinders do not have to be custom selected for the clamp.

It is to be understood, of course, that while the forms of the invention described above constitute the preferred embodiments of the invention, the preceding description is not intended to illustrate all possible forms thereof. It is also to be understood that the words used are words of description, rather than limitation, and the various changes may be made without departing from the spirit and scope of the invention, which should be construed according to the following claims.

What is claimed is:

1. A power operated clamp assembly comprising:

a clamp body;

a reciprocatable member extending into the clamp body and adapted to engage a driving means, the reciprocatable member being reciprocatable between extended and retracted positions;

a first pivot element and a second pivot element, each pivot element defining a pivot axis;

a clamp arm mounted to the clamp body by the first pivot element, the clamp arm being pivotally moveable about the pivot axis of the first pivot element, the clamp arm terminating its movement at first and second positions, the first and second positions being adjustable with respect to the clamp body; and a linkage assembly including a connection pivotable about the pivot axis of the second pivot element, the linkage assembly connecting the reciprocatable member to the clamp arm so as to move the clamp arm between the first and second positions as the reciprocatable member reciprocates between the extended and retracted positions, wherein one pivot element of the first and second pivot elements includes an eccentric shaft having a central axis, the eccentric shaft including an axially extending eccentric portion, the eccentric portion defining the pivot axis of the one pivot element, the pivot axis of the one pivot element being displaced from the central axis of the one pivot element, the eccentric shaft being secured to the clamp body so as to allow adjustment of the pivot axis of the one pivot element with respect to the central axis of the one pivot element, thereby adjusting the first and second positions.

2. The power operated clamp assembly of claim 1 wherein the pivot axis of the one pivot element is displaced from the central axis of the one pivot element by at least about 3.2 mm.

3. The power operated clamp assembly of claim 1 wherein the one pivot element is the first pivot element.

4. The power operated clamp assembly of claim 1 wherein the linkage assembly further comprises:

a drive link, a clamp link, and an idler link, each having first and second ends, the drive link being connected at its first end to the reciprocatable member, the clamp link being connected at its first end to the clamp arm, the clamp link being connected at its second end to the second end of the drive link, the first end of the idler link being mounted to the clamp body by the second pivot element, the second end of the idler link being connected to the second end of the drive link, and thereby connected to the second end of the clamp link.

5. The power operated clamp assembly of claim 4 wherein the one pivot element is the second pivot element.

6. The power operated clamp assembly of claim 1 wherein the reciprocatable member has an end, and the linkage assembly has a drive end and a clamp end, the drive end being adjustably secured to the end of the reciprocatable member, and the clamp end being secured to the clamp arm, and wherein the drive end is adjustable with respect to the end of the reciprocatable member so as to allow selective displacement of the first and second positions.

7. The power operated clamp assembly of claim 6 wherein the drive end is linearly adjustable with respect to the end of the reciprocatable member.

8. The power operated clamp assembly of claim 7 wherein the drive end is adjustable so as to allow a total adjustment of at least about 6.4 mm.

9. The power operated clamp assembly of claim 1 further comprising:

a connection pivotable about a pivot shaft; and at least one spacer received on the pivot shaft, the at least one spacer being formed of a elastic material so as to undergo preferential distortion under compressive forces applied to the connection to reduce clamp bind in the connection.

10. The power operated clamp assembly of claim 1 further comprising:

at least one spring washer received on the first pivot element, the at least one spring washer being positioned so as to compensate for side slop of the clamp arm by continuously urging the clamp arm toward a perpendicular orientation with respect to the pivot axis of the first pivot element.

11. A power operated clamp assembly comprising:

a clamp body;

a reciprocatable member extending into the clamp body and adapted to engage a driving means, the reciprocatable member being reciprocatable between extended and retracted positions, and the reciprocatable member having an end;

a clamp arm mounted to the clamp body, the clamp arm being pivotally moveable and terminating its movement at first and second positions, the first and second positions being adjustable with respect to the clamp body; and a linkage assembly having a drive end and a clamp end, the drive end being adjustably secured to the end of the reciprocatable member, and the clamp end being operatively secured to the clamp arm so as to pivot the clamp arm between the first and second positions as the reciprocatable member reciprocates between the extended and retracted positions, wherein the drive end is adjustable with respect to the end of the reciprocatable member so as to allow adjustment of the first and second positions.

12. The power operated clamp assembly of claim 11 wherein the drive end is linearly adjustable with respect to the end of the reciprocatable member.

13. The power operated clamp assembly of claim 12 wherein the drive end is adjustable so as to allow a total adjustment of at least about 6.4 mm by linearly adjusting the drive end.

14. A power operated clamp assembly comprising:

a clamp body;

a reciprocatable member extending into the clamp body and adapted to engage a driving means, the reciprocatable member being reciprocatable between extended and retracted positions, and the reciprocatable member having an end;

a first pivot element and a second pivot element, each pivot element defining a pivot axis;

a clamp arm pivotally mounted to the clamp body by the first pivot element, the clamp arm being pivotally moveable about the pivot axis of the first pivot element, the clamp arm terminating movement at first and second positions, the first and second positions being adjustable with respect to the clamp body; and a linkage assembly including a connection pivotable about the pivot axis of the second pivot element, the linkage assembly having a drive end and a clamp end, the drive end being adjustably secured to the end of the reciprocatable member, and the clamp end being operatively secured to the clamp arm so as to pivot the clamp arm between the first and second positions as the reciprocatable member reciprocates between the extended and retracted positions, wherein the drive end is adjustable with respect to the end of the reciprocatable member so as to allow adjustment of the first and second positions, and wherein one pivot element of the first and second pivot elements includes an eccentric shaft having a central axis, the eccentric shaft including an axially extending eccentric portion, the eccentric portion defining the pivot axis of the one pivot element, the pivot axis of the one pivot element being displaced from the central axis of the one pivot element, the eccentric shaft being rotationally adjustably secured to the clamp body so as to allow angular adjustment of the pivot axis of the one pivot element with respect to the central axis of the one pivot element, thereby adjusting the first and second positions.

15. The power operated clamp assembly of claim 14 wherein the one pivot element is the first pivot element.

16. The power operated clamp assembly of claim 14 wherein the linkage assembly further comprises:

an idler link having first and second ends, the first end being pivotally mounted to the clamp body by the second pivot element, and the second end defining a central link connection;

a drive link connecting the reciprocatable member to the central link connection; and a clamp link connecting the clamp arm to the central link connection.

17. The power operated clamp assembly of claim 16 wherein the one pivot element is the second pivot element.

18. The power operated clamp assembly of claim 14 wherein the drive end is linearly adjustable with respect to the end of the reciprocatable member.

* * * * *